Figure 1:
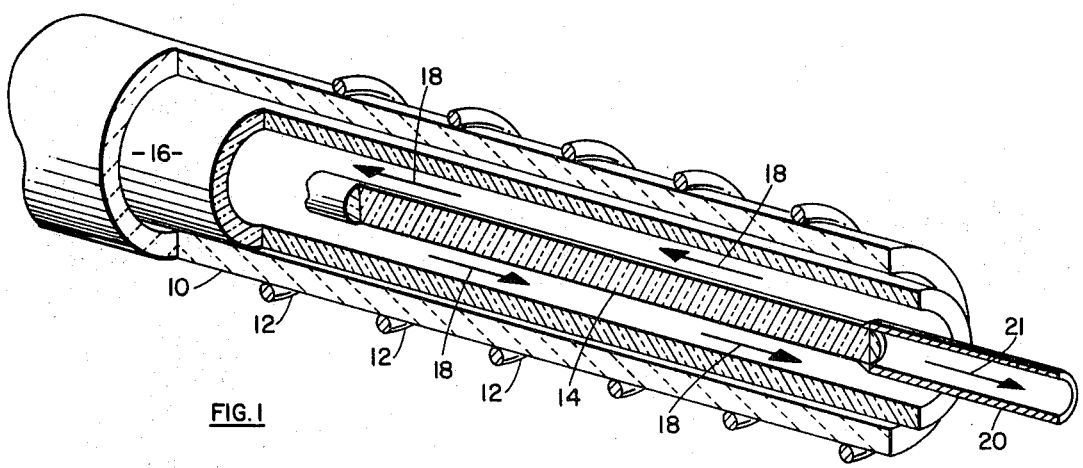

United States Patent

[11] 3,614,663

[72] Inventor  Paul N. Palanos
               Glendora, Calif.
[21] Appl. No. 509,804
[22] Filed     Nov. 26, 1965
[45] Patented  Oct. 19, 1971
[73] Assignee  North American Rockwell Corporation

[54] BLACK-BODY-PUMPED LASER
     8 Claims, 2 Drawing Figs.

[52] U.S. Cl. .................................................. 331/94.5
[51] Int. Cl. ................................................... H01s 3/00
[50] Field of Search ...................................... 331/94.5

[56]            References Cited
              UNITED STATES PATENTS
3,356,966  12/1967  Miller ............................. 331/94.5
3,387,227  6/1968   Mastrup et al. ................. 331/94.5
              FOREIGN PATENTS
789,345    1/1956   France ............................ 331/94.5

OTHER REFERENCES

Fundamentals of Optics, Jenkins and White, Third Edition, McGraw-Hill Book Company, Inc., New York, pg. 431–434 relied upon.

*Primary Examiner*—Ronald L. Wibert
*Assistant Examiner*—V. P. McGraw
*Attorneys*—William R. Lane, Allan Rothenberg and Sidney Magnes ABSTRACT: The laser is submerged in a black body cavity, the black body being maintained at a temperature at which its radiations include the frequency spectrum required to pump the laser. In this arrangement, the laser absorbs—from this frequency spectrum—the frequencies required to pump it; and the unused black body radiations are reabsorbed by the black body cavity, to be later reradiated. Thus, they are not wasted; and a high-efficiency laser arrangement is produced.

PATENTED OCT 19 1971                    3,614,663

INVENTOR.
PAUL N. PALANOS
BY Sidney Magnes
AGENT

BLACK-BODY-PUMPED LASER

BACKGROUND

This invention relates to Black-Body-Pumped Laser and more particularly to means for optically pumping a laser.

It is well known that a laser is a device that produces a narrow, intense beam of "coherent" light that is finding progressively more uses daily. It is also known that many types of lasers must be "optically pumped," which means that they must be exposed to light having a given frequency spectrum (or range of colors). Stated in another way, these lasers will accept only energy having a given frequency specturm; and therefore the pumping source must be such as to contain the given frequency spectrum required by the laser. Unfortunately, prior-art pumping devices tend to have a very wide spectrum of frequencies, so that only a small percentage of these frequencies are accepted by the laser. As a result, the pumping operation is very inefficient, as the energy of all the unacceptable frequencies is wasted. A fuller description of lasers, and their pumping and operation may be found in numerous publications, such as "Optical Masers"—George Birnbaum.

OBJECTS AND DRAWINGS

It is therefore the principal object of the present invention to provide an improved laser-pumping structure.

It is another object of the present invention to provide a laser optical-pumping structure that is much more efficient than prior-art pumping arrangements.

It is a further object of the present invention to provide a laser-pumpig arrangement wherein only the energy of the acceptable frequencies is used, and the energy of the unacceptable frequencies is not wasted.

Figure 2:
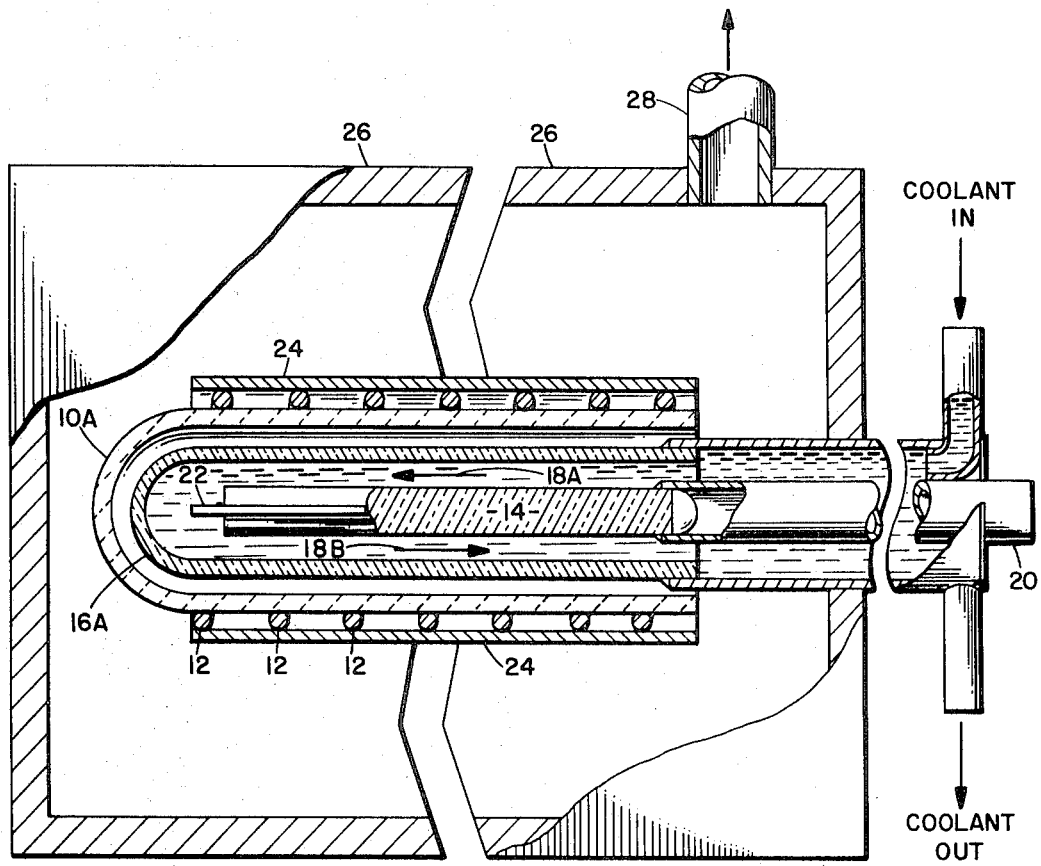

The attainment of these objects and others will be realized from the teachings of the following specification, taken in conjunction with the drawings of which:

FIG. 1 illustrates certain aspects of the invention; and
FIG. 2 shows an embodiment thereof.

SYNOPSIS

Broadly speaking, the present invention contemplates the uses of a black body cavity that radiates a frequency spectrum that contains the given frequency spectrum that is acceptable to a lasing material. The material is positioned in the black body cavity, and the lasing material accepts the energy of its given frequency spectrum; the unused energy being reabsorbed, and then reradiating in the well-known manner of black-body-cavity radiation. In this way, the given frequency spectrum is absorbed by the lasing material; the energy of the other frequencies being reradiated, and therefore not wasted.

INTRODUCTION

It is well known that if a black body is heated to a particular temperature, it will emit a particular frequency spectrum corresponding to the temperature of the black body; for example, if a piece of carbon is heated to progressively higher temperatures, it will go from dull red through yellow to brilliant white. It is also known that each black body temperature has an associated frequency spectrum, so that the particular frequency spectrum emitted by the black body therefore identifies the "color-temperature" of the black body. It is also known that if the black body comprises a cavity, any object placed in the black body cavity will be raised to the same temperature as the black body. Moreover, if the object is cooled slightly, so that it is at a lower temperature than the black body, it will continuously absorb energy (heat) from the black body; the energy absorbed by the object tending to cool the black body, which however, is continuously heated by the heating elements that maintain the black body at the desired temperature. A fuller discussion of black bodies will be found in many textbooks, such as "Light"—R.W. Ditchburn; "Physical Optics"—R.W. Wood, and "Fundamentals of Optics"—Jenkins and White.

Broadly stated, a laser and its optical pumping operates as follows. Certain electrons of a lasing material must be raised from their quiescent state to a designated excitation levels; and, when they fall back to their quiescent state through a process known as "stimulated emission," they emit light—at which time the device is said to "lase." In order for these electrons to reach their excited levels, they must absorb energy; and the abosrbed energy must be in the form of particular frequencies (colors) of light—this process being known as "optical pumping." As indicated above, prior-art optical pumping arrangements provided a spectrum of frequencies; and the lasing material accepted only a small portion of these frequencies, the unacceptable frequencies being wasted as heat.

DESCRIPTION OF THE INVENTION

The present inventive concept provides the lasing material with its acceptable frequencies, and causes the unacceptable frequencies to be abosrbed and reradiated as part of the black-body radiation, so they are not wasted as heat.

The operation of the invention will be understood from FIG. 1. Here the black body comprises a tube 10 of refractory material, such as thorium oxide, that is heated to a desired temperature—such as 3,000° K.—by means such as resistance wires 12, which may be in the form of a coil circumscribing the tube 10. Since tube 10 is a refractory material, it may be raised to an extremely high temperature without deteriorating; and resistance wires 12 may be connected to a suitable source of power (not shown) to maintain the tube 10 at the desired temperature. Since thorium oxide is actually an ivory color, an additive, such as a finely divided metal (e.g. iridium, tungsten, tantalum) is mixed with the powder of which the tube is formed to darken it, and make it approach the ideal black body. In this way the inside of tube 10 forms a black-body cavity having a particular color-temperature, and emitting a black-body radiation frequency spectrum corresponding to that color-temperature.

Positioned within the black body 10 is a lasing material 14 of the type that requires optical pumping, meaning that lasing material 14 will accept a given frequency spectrum to raise selected electrons to their excited levels. Material 14 may be of the solid-state continuous-wavelength YAG: $Nd^{+3}$ type (yttrium-aluminum-garnet-neodymium in the +3 oxidation state) that emits radiation of 1.062-micron wavelength. Preferably, the black-body cavity is at such a color-temperature that its frequency spectrum has a peak at the given frequency spectrum required for pumping laser material 14. As a result, lasing material 14 continuously accepts only the given frequency spectrum required to pump it; the energy of the abosrbed frequencies being emitted as laser light. The other, unacceptable, frequencies produced by the black-body cavity merely echo around the black-body cavity until absorbed by the cavity walls, and are then reradiated as black-body radiation. In this way, there is a minimum of wasted energy.

Lasers must be cooled so that they are not destroyed by the extremely high temperatures; therefore in FIG. 1, lasing material 14 is enclosed in a cooling tube 16, which has as its primary purpose the function of providing a channel through which a liquid or gaseous coolant may flow past material 14, as indicated by arrows 18, and thus maintain material 14 at an optimum operating temperature. Cooling tube 16 also prevents the coolant from acutally touching the heated walls of thorium oxide tube 10.

In order for lasing material 14 to absorb the maximum amount of energy, and to keep colling tube 16 as cool as possible, cooling tube 16 is formed of material, such as quartz, that does not absorb any appreciable amount of energy in the frequency spectrum of the black body's color-temperature radiations. If material 14 is a solid rod, it may be supported by means such as a metal (e.g. silver) tube 20 that positions it within the cooling tube 16, and permits the laser light to be emitted from the structure toward the right, as indicated by arrow 21. Suitable spacing arragements, not illustrated, may be used to position cooling tube concentric with, and properly spaced from, material 14 and thorium oxide tube 10.

Since it is desirable that the coolant should not absorb energy radiated from the black body, carbon tetrachloride is used, since it is transparent to the radiations in the frequency spectrum of the selected color-temperature.

It has been found that the device of FIG. 1 permits some light and heat to escape from both open ends; and in order to minimize losses, the arrangement of FIG. 2 may be used. In FIG. 2, lasing material 14 is inserted into a test-tube-like cooling chamber 16A of fused quartz; chamber 16A having a divider 22 that causes the coolant to flow in one direction above the divider and in the other direction below the divider as indicated by arrows 18a and 18b. The thorium oxide tube 10A is also formed into a test-tube-like configuration, so that it forms a black-body having just one opening. Resistance heating wires 12 are positioned as previously described, except that they are now enclosed by another tube 24 of refractory material in order to concentrate the heat in the black-body cavity. The entire assembly is enclosed in a housing 26 that contains a thermal-insulating material; it having been found that tungsten powder sized less than 6 microns in diameter in an evacuated atmosphere provides extremely good heat insulation. Therefore, housing 26 is filled with tungsten powder, and the housing is evacuated through an evacuation pipe 28.

The overall structure is about 120 cubic inches in volume, and its efficiency is about 100 to 1,000 times as great as prior-art continuous-wave systems that emit radiation in the visible or near-infrared range.

For a higher temperature black-body cavity, the tube may be formed of a material such as hafnium carbide, tantalum carbide, or carbon; and the heating may be achieved by using resistance "wires" of these same materials. Alternatively, electric heating current may be passed through the tube itself, or provided by means of induction.

Alternatively, the heating can be achieved by utilizing the heat energy from a radioactive material, such as hafnium 181 ($72Hf^{181}$). To do this, tube 10 or 10A is formed of radioactive hafnium carbide, and the heating wires are omitted. As the radioactive hafnium carbide decomposes, it heats the tube causing the emission of black-body radiation, and forming non-radioactive tantalum carbide ($73Ta^{181}$), which can withstand a temperature of about 3500° K; thus providing a hotter balck-body which has higher color temperature that includes a larger frequency spectrum for optical pumping. It is desirable that the thermal insulating material in the evacuated housing be non-radioactive hafnium carbide powder of less than six-micron diameter, as previously described, as this material is capable of serving as insulation for the tube 10A when heated to 4000° K.

Although the invention has been described and illustrated in detail, it is to be clearly understood that the same is by way of illustration and example only and is not to be taken by way of limitation, the spirit and scope of this invention being limited only by the terms of the appended claims.

What is claimed is:
1. The combination comprising:
    a laser adapted to accept energy of a given frequency spectrum;
    a pumping source comprising a circumjacent black-body cavity that radiates a black-body frequency spectrum that contains said given frequency spectrum;
    means for maintaining said black-body cavity at a temperature for radiating said desired black-body frequency spectrum; and
    cooling means for preventing said laser from overheating, said cooling means comprising a cooling tube and a coolant that do not absorb any appreciable energy in said given frequency spectrum.
2. The combination of claim 1 wherein said temperature-maintaining means comprises a heat-producing radioactive material.
3. The combination of claim 1 wherein said black-body radiation frequency spectrum peaks at substantally said given spectrum.
4. The combination of claim 1 including housing means containing a thermoinsulative material, for housing and minimizing heat loss from said combination.
5. The combination comprising:
    a tube closed at one end to provide a black-body cavity, and formed of a mixture containing thorium oxide;
    a heater coil on the thorium oxide tube, said heater coil heating said tube to produce a black-body radiation frequency spectrum;
    a coolant tube, substantially transparent to said black-body radiation frequency spectrum, positioned within the black-body cavity, and spaced therefrom, said tube being closed at one end and formed with a divider for directing coolant fluid through the coolant tube and from the other end thereof;
    a lasing material supported within the coolant tube, and spaced therefrom, said lasing body absorbing a given frequency spectrum of said black-body radiation frequency spectrum;
    a sleeve of refractory material circumscribing said tube and heater coil to minimize heat loss; and
    a housing, containing thermal-insulating material, enclosing said sleeve.
6. The combination comprising:
    a laser adapted to accept energy of a given frequency spectrum; and
    a laser-pumping arrangement, comprising a black-body cavity positioned circumjacent the laser, said pumping arrangement radiating to said laser, a black-body frequency spectrum that contains said given frequency spectrum, the unaccepted portion of said black-body frequency spectrum being reabsorbed by the walls of said black-body cavity to heat said walls and to provide a high-efficiency optical-pumping operation.
7. The combination of claim 6 including cooling means for preventing said laser from overheating, said cooling means comprising a fluid coolant that does not absorb any appreciable energy i said given spectrum.
8. The combination comprising:
    a lasing material adapted to absorb radiation in a given frequency spectrum;
    means, comprising a tube for providing a black-body cavity;
    heating means for heating said tube to produce a black-body radiation frequency spectrum containing said given frequency;
    a coolant tube—containing a coolant fluid, said tube and fluid being substantially transparent to said given frequency spectrum—positioned within the black-body cavity, and spaced therefrom, said coolant tube being closed at one end, and containing means for directing coolant fluid through the coolant tube; and
    means for positioning said lasing material within, and spaced from, said coolant tube.